Jan. 20, 1959     E. P. HURD     2,869,929
WHEEL COVER
Filed July 6, 1954     3 Sheets-Sheet 1
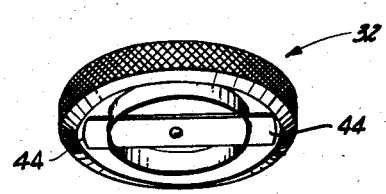
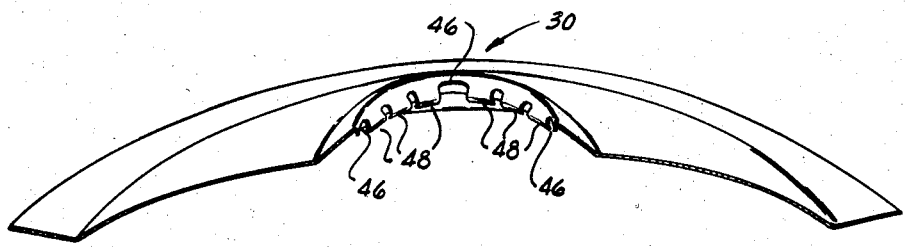
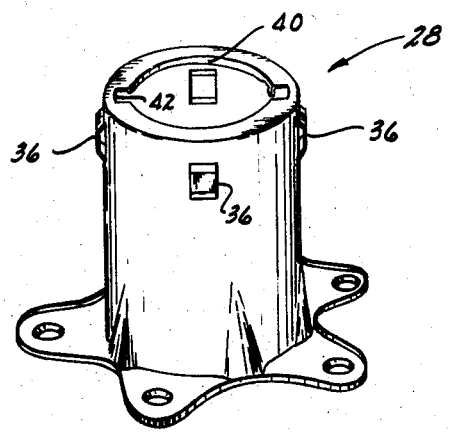
INVENTOR.
EDWIN P. HURD
BY
SMITH, OLSEN & KOTTS
ATTORNEYS Jan. 20, 1959  E. P. HURD  2,869,929
WHEEL COVER Filed July 6, 1954  3 Sheets-Sheet 2

INVENTOR.
EDWIN P. HURD
BY
SMITH, OLSEN & KOTTS
ATTORNEYS

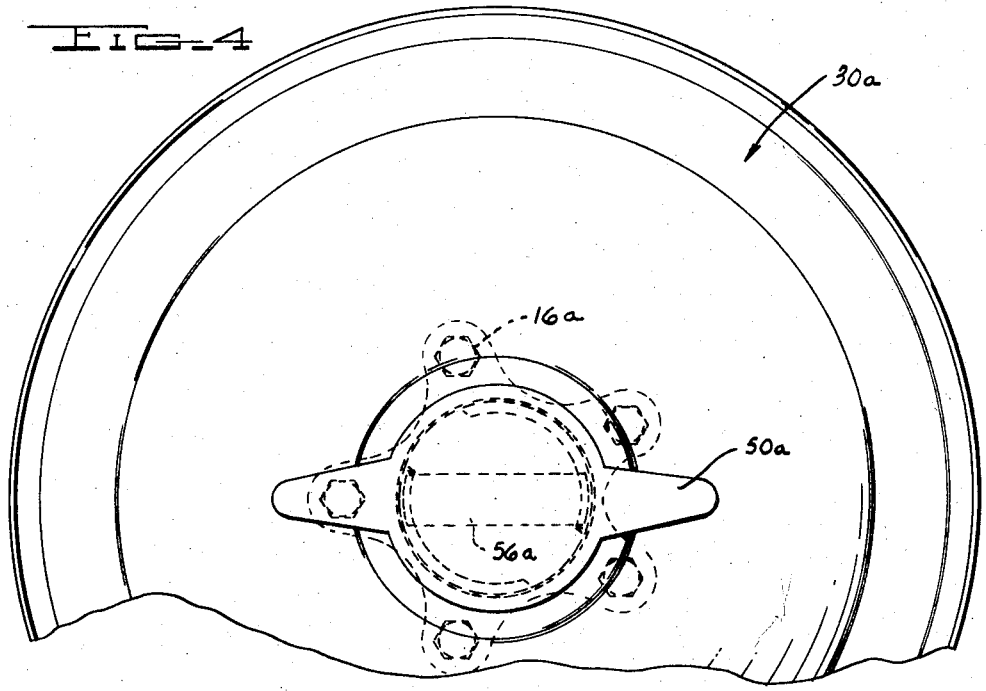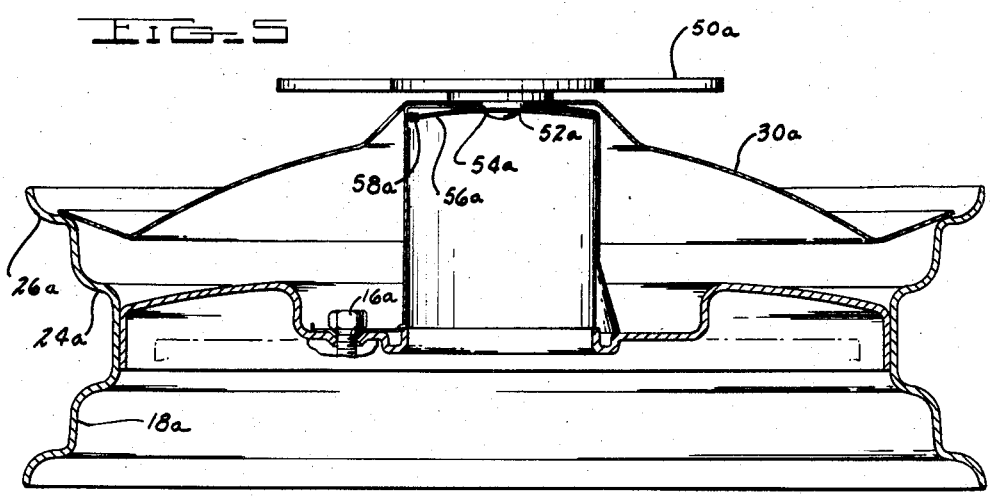

United States Patent Office 2,869,929
Patented Jan. 20, 1959

2,869,929
WHEEL COVER

Edwin P. Hurd, Detroit, Mich., assignor to Hurd Lock & Manufacturing Company, Detroit, Mich., a corporation of Michigan Application July 6, 1954, Serial No. 441,461

7 Claims. (Cl. 301—37)

This invention relates to a wheel structure and more particularly to an ornamental cover for disposition over the outer side surface of a wheel.

It is an object of the present invention to provide a wheel cover that has an improved means for attaching the same to a wheel of an automobile, said attaching means being constructed and arranged so that close tolerances between the wheel cover and the wheel assembly are not required in order to retain the cover in its assembled position even under the most severe driving conditions.

It is another object of the present invention to provide a wheel cover of the foregoing character which has standardized parts that can be used interchangeably on various wheel assemblies and includes an ornamental member which can be mounted therewith to identify the vehicle model or make.

It is still another object of the present invention to provide a wheel cover of the foregoing character in which the interchangeable parts include an inner annulus held in place by the conventional wheel mounting bolts and an outer annulus adapted to overlap and conceal portions of the wheel and wheel rim, and the ornamental member locks such annuli together, serving as the only retaining means for the outer annulus.

Other objects of this invention will appear in the following description and appended claims, reference being had to the accompanying drawings forming a part of this specification wherein like reference characters designate corresponding parts in the several views.

In the drawings:

Figure 1 is an exploded view showing three principal parts of a wheel cover assembly embodying the present invention;

Fig. 4 is a side elevation of a modified form of the invention; and

Fig. 5 is a sectional view of the wheel cover assembly shown in Fig. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 2:
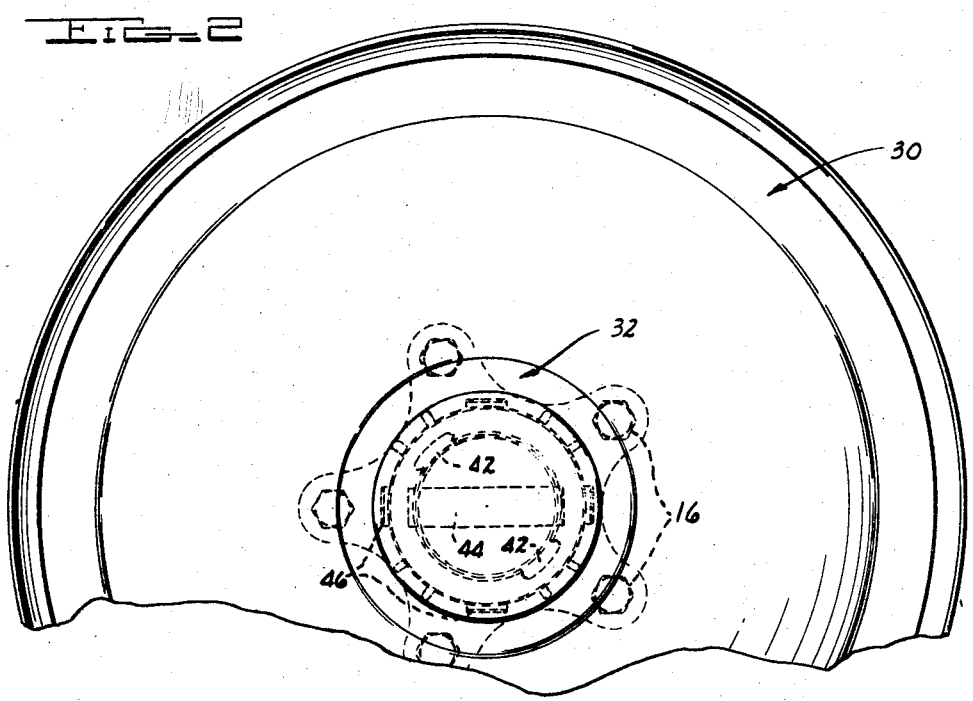
Fig. 2 is a side elevation of the upper half of the wheel cover assembly.
Figure 3:
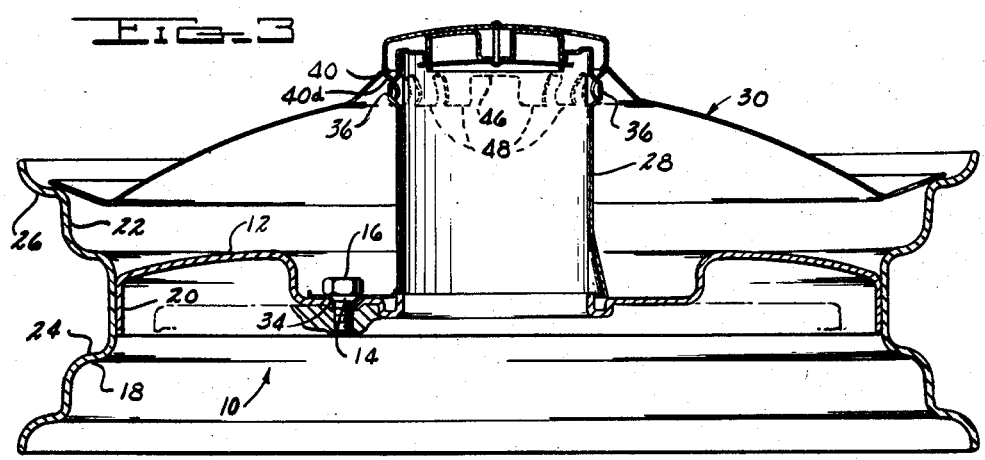
Fig. 3 is a sectional view showing the wheel cover assembly in its mounted position on a wheel.

Referring now to the drawings, a more detailed description of the invention will be given. The embodiment shown in Figures 1 to 3 is adapted to be mounted on a conventional automobile wheel 10 having a hub part 12 in which is formed an annular series of apertures 14 for receiving a plurality of mounting bolts 16. A drop center rim 18 is fastened to the outer flange 20 of hub part 12. The rim 18 is a conventional type having an intermediate flange 22 and radially inner and outer side flanges 24 and 26.

The present wheel cover comprises three principal parts, an inner member 28, a circular cover member 30 and an ornamental cap 32 for fastening the cover member 30 to the inner member 28. The latter is preferably formed as a sleeve with its one end flared out and having apertures 34 formed therein which correspond in number and spacing to the apertures 14 in the wheel part 12. By virtue of this construction the inner member 28 can be securely fastened to the wheel 12 when the latter is mounted in place by bolts 16. The other end of inner member 28 is constructed and arranged so that it can carry the circular cover member 30, and the inner member 28 in cooperation with ornamental cap 32 will retain cover member 30 in a fixed position.

One means for accomplishing this result is shown in Figs. 1 and 3 wherein a plurality of retaining bumps or embossments 36 are formed in the sleeve. The circular cover member 30 is an annulus with its central opening being sufficiently large to fit over the sleeve but insufficient in size to pass over such bumps or embossments. The inner edge 38 of the annulus can then be clamped securely in place between the lip portion 40 of cap 32 and the bumps or embossments 36.

Any suitable means can be employed for securely fastening the cap 32 to the sleeve 28 during this clamping operation. In the described embodiment a conventional bayonet type joint is used. For this purpose the edge of sleeve 28 is turned inwardly at 40 and two slots 42 are formed therein for receiving the ends of the flat spring 44.

The circular cover member 30 has four slots 46 into which the bumps or embossments 36 extend so as to prevent rotation of the cover member 30 relative to the support member 28. In addition, a plurality of fingers 48 are provided which act as anti-rattling devices when the cover assembly is secured in place on the wheel 10. The fingers 48 are resilient in character and press against the outer side of sleeve 28 when the cover member 30 is passed over the end of the sleeve 28. Thus, they prevent rattling between the three principal parts of the cover assembly.

One of the features of the present invention is that no means is required for fastening the circular cover member 30 to the rim 18. The cover member 30 is formed from sheet metal having resilient characteristics so that when it is urged tightly onto sleeve 28 by the cap 32, the outer periphery of cover member 30 will be urged against the side flange 26 of rim 18. By virtue of this construction and arrangement there is no problem of fitting the cover to the rim as so frequently occurs when using biting fingers or the like for gripping the rim. In the latter case if the rim and cover are not fitted within close allowable tolerances the cover is apt to be sprung from the rim whenever a sharp bump occurs to the wheel assembly.

Another of the features of the present invention is that standardized parts can be used for the inner member 28 and the circular cover member 30, such parts being interchangeable and usable on more than one make and model of car. The ornamental cap 32 can be designed to identify such cars or models. Thus, by virtue of the standardization of parts the cost of the cover can be maintained at a minimum and a distinct and different appearance can be effected in the covers used with different makes and models of automobiles.

It is not always necessary that the circular cover member 30 be fastened to the inner member 28 in exactly the same manner explained above. Another embodiment of the invention that may be used is shown in Figs. 4 and 5 wherein similar reference numerals indicate corresponding parts. Here the circular cover member 30a has a rotatable ornamental member 50a which has a pin 52a extending through an aperture 54a in the cover member 30a. A conventional type of flat spring 56a is fastened to the pin 52a and provides with the lip portion 58a a conventional type of bayonet joint.

Having thus described my invention, I claim:

1. In combination, a wheel including a rim part and a central wheel hub part having an annular series of apertures for the reception of wheel mounting bolts, and a wheel cover assembly comprising an annular support member adapted to be secured to said hub part by the mounting bolts, said support member having its inner margin turned axially outwardly with a plurality of spaced radial protrusions formed therein, an annular cover member disposed over the outer surface of the wheel between the rim part and the support member, the inner margin of said cover member engaging the axially outwardly turned portion of the support member and being seated on the radial protrusions, and a bayonet-type cap fastened to said support member and pressing the cover member against said protrusions.

2. In combination, a wheel including a rim part and a central wheel hub part having an annular series of apertures for the reception of wheel mounting bolts, and a wheel cover assembly comprising an annular support member adapted to be secured to said hub part by the mounting bolts, said support member having its inner margin turned axially outwardly with a plurality of spaced radial protrusions formed therein, an annular cover member disposed over the outer surface of the wheel between the rim part and the support member, the inner margin of said cover member having a plurality of resilient anti-rattling fingers engaging the axially outwardly turned portion of the support member with portions between the fingers being seated on said radial protrusions, and a cap fastened to said support member and pressing the cover member against said protrusions.

3. A wheel cover assembly comprising an outer annular member, an inner member having an annular series of apertures for the reception of wheel mounting bolts and an axial projection on which the outer annular member can be seated, a plurality of resilient anti-rattling fingers carried by one of said members and engaging the other member to prevent rattling between such members when the outer annular member is seated on the inner member, and a cap attachable to said projection and engaging the outer annular member so as to clamp the latter to the inner annular member.

4. A wheel cover assembly comprising an outer annular member having a margin adapted to seat on a side flange of a drop center rim, an inner annular member having an annular series of apertures for the reception of wheel mounting bolts, the radially inner portion of said member being turned axially outwardly and having a plurality of protuberances on which the radially inner edge of the outer annular member is seated, and a cap attachable to the inner margin of the inner annular member, said cap being in engagement with the outer annular member so as to press the inner edge of the latter into tight engagement with the protuberances of the inner annular member.

5. In combination, a wheel including a drop center type rim having a side flange and a central wheel hub having an annular series of apertures for the reception of a wheel mounting bolts, and a wheel cover assembly comprising an annular support member secured to the outer side of said hub by the mounting bolts with the end of the support member projecting axially outward of the side flange of said rim, a circular cover member disposed over the outer surface of the wheel between the rim and said end of the support member with the radially outer portion of the cover member bearing solely against the side flange of the rim, the radially inner portion of the cover member having a plurality of resilient anti-rattling fingers engaging the axially outward projecting portion of the support member, and a fastening cap attached to said support so as to urge the circular cover member axially inwardly with its outer portion pressed against the side flange of the rim.

6. In combination, a wheel including a drop center type rim having a side flange and a central wheel hub having an annular series of apertures for the reception of wheel mounting bolts, and a wheel cover assembly comprising a circular member having an annular series of apertures by which it can be securely attached to the outer side of said hub by the mounting bolts, said member having a radially inner margin turned axially outwardly beyond the side flange of said rim and having a plurality of spaced radial protrusions, a circular cover member disposed over the outer surface of the wheel between the rim and said inner margin with the radially outer portion of said cover member bearing solely against the side flange of the rim and the radially inner portion of said cover member being seated on said radial protrusions and having resilient anti-rattling fingers engaging the first-named circular member, and an ornamental fastening cap removably attached to said circular member so as to urge the cover member axially inwardly with its outer portion pressed against said side flange of the rim.

7. In combination, a wheel including a drop center type rim having a side flange and a central wheel hub having an annular series of apertures for the reception of wheel mounting bolts, and a wheel cover assembly comprising an annular member having a series of apertures for receiving said wheel mounting bolts for securely attaching the same to the outer side of said hub, the radially inner margin being turned axially outwardly and projecting beyond the side flange of said rim, means in the inner margin for retaining an ornamental cap over the opening in said annular member, an annular cover member disposed over the outer side of said wheel between the rim and said inner margin with the radially outer portion of said cover member bearing solely against the side flange of said rim, anti-rattling means carried by one of said members and resiliently engaging the other member to prevent rattling between such members, and an ornamental cap fastened to said means urging the cover member axially inwardly with the outer portion of the latter pressed against the flange of the rim.

References Cited in the file of this patent

UNITED STATES PATENTS

| 2,130,207 | Van Halteren | Sept. 13, 1938 |
| 2,159,881 | Booth | May 23, 1939 |
| 2,329,945 | Schatzman | Sept. 21, 1943 |
| 2,544,703 | Lyon | Mar. 13, 1951 |
| 2,729,510 | Lyon | Jan. 3, 1956 |

FOREIGN PATENTS

| 279,319 | Italy | Nov. 8, 1930 |
| 421,260 | Italy | May 20, 1947 |
| 436,894 | Italy | June 16, 1948 |
| 630,176 | Great Britain | Oct. 6, 1949 |